(12) United States Patent
Franz et al.

(10) Patent No.: US 12,516,734 B2
(45) Date of Patent: Jan. 6, 2026

(54) HIGH-PRESSURE RADIAL SHAFT SEAL WITH ENHANCED WEAR RESISTANCE

(71) Applicant: TRELLEBORG SEALING SOLUTIONS US, INC., Ft. Wayne, IN (US)

(72) Inventors: Martin Franz, Wannweil (DE); Jeff Baehl, Fort Wayne, IN (US); Nino Dakov, Stuttgart (DE); Felix Schiefer, Stuttgart (DE)

(73) Assignee: TRELLEBORG SEALING SOLUTIONS US, INC., Ft. Wayne, IN (US)

( * ) Notice: Subject to any disclaimer, the term of this patent is extended or adjusted under 35 U.S.C. 154(b) by 0 days.

(21) Appl. No.: 18/757,279

(22) Filed: Jun. 27, 2024

(65) Prior Publication Data

US 2026/0002590 A1    Jan. 1, 2026

(51) Int. Cl.
*F16J 15/3204*        (2016.01)

(52) U.S. Cl.
CPC ................... *F16J 15/3204* (2013.01)

(58) Field of Classification Search
CPC ... F16J 15/3212; F16J 15/3208; F16J 15/3204
See application file for complete search history.

(56) References Cited

U.S. PATENT DOCUMENTS

| | | | |
|---|---|---|---|
| 2,264,148 A * | 11/1941 | Fisher, Jr. ............ | F16J 15/3212 277/577 |
| 2,434,484 A | 1/1948 | Chambers, Jr. | |
| 2,434,485 A * | 1/1948 | Chambers, Jr. ...... | F16J 15/3212 277/572 |
| 2,538,866 A | 1/1951 | Gilbert | |
| 2,760,802 A * | 8/1956 | Haley .................. | F16J 15/3212 277/561 |
| 2,836,450 A * | 5/1958 | Riesing ................ | F16J 15/3212 277/575 |
| 3,871,665 A * | 3/1975 | Burke .................. | F16J 15/3212 277/560 |

(Continued)

FOREIGN PATENT DOCUMENTS

| CH | 259554 A | 1/1949 |
|---|---|---|
| DE | 10 2013 200 216 A1 | 7/2013 |

(Continued)

*Primary Examiner* — Eugene G Byrd
(74) *Attorney, Agent, or Firm* — Orbit IP, LLP; Marc G. Martino

(57) ABSTRACT

A radial shaft seal has a polymer sealing ring, a holding section having a polymer-bonded reinforcement insert, and a sealing lip extending away from the holding section in an axial direction of the sealing ring. The sealing lip has a first end connected to the holding section and a free second end provided with a sealing edge on a radial inside and a groove on a radial outside of the sealing lip. A radially deformable deformation zone of the sealing lip is between the first end and the sealing edge. The radial shaft seal has a spring in the groove energizing the sealing lip. The sealing ring has a protrusion axially extending from the holding section towards the spring forming an axial stop for the spring and, thus, for the second end of the sealing lip when the deformation zone of the sealing lip is deformed radially inwards.

18 Claims, 3 Drawing Sheets

(56) References Cited

U.S. PATENT DOCUMENTS

| | | | |
|---|---|---|---|
| 3,921,992 A | | 11/1975 | Bertin |
| 4,141,563 A | * | 2/1979 | Wu ..................... F16J 15/3208 |
| | | | 277/575 |
| 4,172,599 A | * | 10/1979 | Forch .................... F16J 15/322 |
| | | | 277/572 |
| 4,671,519 A | | 6/1987 | Bras et al. |
| 5,244,215 A | * | 9/1993 | Cather, Jr. ........... F16J 15/3252 |
| | | | 277/561 |
| 9,273,742 B2 | | 3/2016 | Balsells et al. |
| 9,845,880 B2 | * | 12/2017 | Mueller-Niehuus ... F16J 15/322 |
| 12,215,787 B2 | * | 2/2025 | Stark .................... F16J 15/3232 |
| 2013/0307222 A1 | * | 11/2013 | Von Bergen ......... F16J 15/3212 |
| | | | 277/553 |
| 2013/0320629 A1 | | 12/2013 | Benedix et al. |
| 2013/0322791 A1 | * | 12/2013 | Dlugai ................ F16C 33/7883 |
| | | | 384/91 |
| 2016/0223086 A1 | | 8/2016 | Balsells et al. |
| 2018/0058585 A1 | * | 3/2018 | Sato .................... F16J 15/3216 |
| 2022/0282792 A1 | | 9/2022 | Zhao et al. |

FOREIGN PATENT DOCUMENTS

| | | |
|---|---|---|
| EP | 0859174 A1 | 8/1998 |
| EP | 2948693 A1 | 12/2015 |
| FR | 2 614 383 A1 | 10/1988 |
| GB | 896514 A | 5/1962 |
| WO | 99/49243 A1 | 9/1999 |
| WO | 2013/096160 A1 | 6/2013 |

\* cited by examiner

HIGH-PRESSURE RADIAL SHAFT SEAL WITH ENHANCED WEAR RESISTANCE

CROSS-REFERENCE TO RELATED APPLICATIONS

None.

DESCRIPTION

Field of the Invention

The present invention generally relates to a radial shaft seal preloaded or energized by a spring.

Background of the Invention

High-pressure radial shaft seals are typically used in hydraulic pumps to seal a continuously rotating shaft at a housing bore. Whenever the seal is pressurized, the laydown of a sealing lip on the shaft is increased, which leads to higher wear. At very high pressure, the cross-section of the seal may collapse, pushing a garter spring out of a spring-retaining groove.

Radial shaft seals are used to seal continuously rotating shafts at housing bores. The radial shaft seals is a rubber-to-metal seal which typically separates an air from an oil side. An elastomer-covered metal insert ensures a proper static sealing at the outer diameter and provides additional stability to the sealing profile. A sealing lip consists of a sharp sealing edge which is connected to the reinforcement insert via a deformation zone, also referred to as a flexible membrane. The sealing edge is pressed against the shaft or energized via a garter spring.

The contact force, also referred to as radial force or radial load, between the seal and the shaft results from both a garter spring as well as the elastic deformation of the seal due to the overlap with the shaft. In the sealing edge, an air side contact angle to the shaft is smaller than the oil side contact angle. The result is an asymmetric contact pressure distribution between the seal and the shaft. The asymmetry in contact pressure is needed for a reliable dynamic sealing. The membrane adds flexibility to the sealing edge which is needed to follow the misalignment-induced oscillations of the shaft during operation. By design, the radial shaft seal is capable of sealing against pressure from the oil side. Whenever the seal is pressurized, the membrane together with the sealing edge are pressed down onto the shaft. The pressure activation of the lip ensures a leak-tight sealing behavior at an overpressure from the oil side. However, the oil-side overpressure as well increases the contact area and thus the friction, contact temperature and, ultimately, wear of the seal.

To account for the increased load on the sealing lip with pressure activation, special lip designs are already used for high-pressure radial shaft seals. To reduce the laydown of the sealing lip on the shaft at higher pressure, the membrane of the radial shaft seal is typically made stiffer, by either shortening, or thickening the membrane all around the circumference of the radial shaft seal.

What is needed in the art are improvements in wear resistance of the radial shaft seal.

SUMMARY OF THE INVENTION

The object of the invention is to specify a radial shaft seal and a sealing arrangement having such a radial shaft seal, in which a reduced wear of the radial shaft seal can be achieved without negatively affecting the sealing characteristics of the radial shaft seal.

The object is achieved by a radial shaft seal having the features specified in the independent claims. Preferred embodiments of the invention are specified in the dependent claims and in the description.

The radial shaft seal according to the invention is intended for use in a sealing arrangement for sealing two components. The radial shaft seal comprises a sealing ring made from polymer material (e. g. elastomer) with a holding section having a polymer-bonded, e.g., an polymer-covered, reinforcement (e.g., metal) insert and with a sealing lip extending away from the holding section in an axial direction of the sealing ring. The sealing lip has a first end connected to the holding section and a free second end provided with a sealing edge on a radial inside of the sealing lip and a groove on a radial outside of the sealing lip. A radially deformable deformation zone, also referred to as a flexible membrane, of the sealing lip is provided between the first end and the sealing edge mainly to allow the sealing lip to follow an eccentric shaft. A spring is received in the groove for preloading the sealing lip radially inwards. The sealing ring comprises at least one protrusion formed on the holding section and axially extending from the holding section towards the spring to form an axial stop for the spring and, thus, for the second end of the sealing lip when the deformation zone of the sealing lip is deformed radially inwards. In the unmounted state or, when mounted, in the unpressurized state of the radial shaft seal, the spring can either abut the protrusions or be spaced apart from the protrusions.

As a result, a considerably lower laydown is achieved which translates to an improved wear resistance of the radial shaft seal. In addition, the at least one projection can support the spring. It should be understood, that the protrusions could be shaped in a way, that processing and/or functionality will be influenced in a positive manner.

A finite element analysis (FEA) was used to investigate the deformation and stresses in the radial shaft seal according to the invention. The focus of the FEA was the deformation of the radial shaft seal at high pressure, e.g., 10 bar overpressure. The complex spring to groove & protrusion interaction is made visible by using a detailed 3D section model of the actual spring in its groove. In one embodiment, the cross-section at the positions of the protrusion tilts 27° with respect to the radial direction. Outside the protrusion area, the tilting is 34° and thus 25% greater. In consequence, the effect of the protrusion is to locally reduce the lay-down of the sealing lip on the shaft. The protrusions result in an undulation of the contact band in the circumferential direction when the radial shaft seal is pressurized in the mounted state. At the location of the protrusions, the contact width is reduced, forming a daisy pattern along the circumference of the radial shaft seal.

The reduced contact width translates to a lower friction torque and less wear on the radial shaft seal. Furthermore, the undulation in the sealing contact can improve the lubrication underneath the sealing lip, prolonging the lifetime of the radial shaft seal.

Another aspect in favor of an improved lubricating film is the change in the maximal contact pressure along the circumference. At the location of the protrusions, the contact band width becomes minimal and the contact stress is affected. This type of 3D-contact area and contact pressure distribution is deemed favorable for the formation of a stable lubrication film between the radial shaft seal and the shaft.

Preferably, the at least one protrusion is at the radial height of the radial inner end of the reinforcement insert.

Preferably, the at least one protrusion is integrally formed with the polymer material of the holding section or with the reinforcement insert of the holding section. Alternatively, the at least one protrusion is formed as a separate insert which is form-fitting and/or force-fitting and/or material-fitting to the holding section, e.g., made by additive manufacturing or injection molding, or other suitable process.

Preferably, the at least one protrusion has a stop surface which is either parallel to a radial plane of the sealing ring or inclined in a direction towards the spring or away from the spring by an angle of at most 40°.

In a preferred embodiment of the invention, the sealing ring comprises one enclosed circumferential protrusion formed on the holding section to form a circumferential axial stop for the spring and, thus, for the second end of the sealing lip when the deformation zone of the sealing lip is deformed radially inwards.

In another preferred embodiment of the invention, the sealing ring comprises a plurality of protrusions spaced apart from each other in the circumferential direction of the sealing ring. Preferably, as viewed in the circumferential direction of the sealing ring, the distance between the protrusions is greater than the width of the protrusions. For example, the distance between the protrusions can be at least two times, preferably at least five times, greater than the width of the protrusions. Preferably, the protrusions are equidistantly spaced apart from each other in the circumferential direction of the sealing ring. Preferably, the sealing ring has a plurality of elevations and/or indentations within the groove at and/or between the positions of the protrusions such that the spring is locally lifted at least partially out of the groove by the elevations or locally lowered within the groove by the indentations.

Preferably, the deforming zone is weakened in the region at and/or between the protrusions. For example, the deforming zone (membrane) is thinner by 10 to 50%, preferably by 20 to 40%, in the weakened region than in the region which is not weakened. As a result, the deformation behaviour of the deforming zone can advantageously be affected when pressurized and, for example, an early contact of the protrusions with the spring can be achieved.

In a variant of this embodiment, an axial outer groove flank, facing the second end of the sealing lip, of the groove is formed by an axial outer groove wall of the sealing lip. The outer groove wall has a plurality of axial outer projections at and/or between the positions of the protrusions such that the wall thickness of the outer groove wall is greater than at the positions of the axial outer projections. Further, the axial outer groove flank can have a plurality of axial inner projections at and/or between the positions of the protrusions such that the spring is locally deflected in an axial direction towards the protrusions. In one embodiment, at least one of the protrusions axially extends further towards the spring than the other protrusions.

Preferably, the at least one protrusion is at the radial height of the radial inner end of the reinforcement insert. Preferably, the radial height of the protrusion corresponds maximally to the double diameter of the groove, in particular, maximally to the diameter of the groove. Preferably, the axial length of the protrusion with respect to the reinforcement insert is maximally five times the diameter of the groove, in particular, maximally three times the diameter of the groove. A short deformation zone is advantageous for the sealing behavior of radial shaft seals.

In one embodiment, at least one of the protrusions axially extends further towards the spring than the other protrusions. For example, some protrusions are always in contact with the spring and other protrusions only when pressurized.

A sealing arrangement comprises a first machine part and a second machine part surrounded by the first machine part, which machine parts are arranged at a space to seal a gap, and a radial shaft seal according to the invention. The holding section of the radial shaft seal is held in one of the two machine parts, and the sealing lip of the radial shaft seal mates with a running counter surface of the respective other machine part to form a dynamic sealing contact. The at least one protrusion forms an axial stop for the spring and, thus, for the second end of the sealing lip when the deformation zone of the sealing lip is deformed radially inwards.

In a further aspect of the invention, each of the local protrusions is integrally formed on both the radial outside of the sealing lip and the holding section. The purpose of the local protrusions is to prevent the cross-section of the deformation zone from collapsing at high pressure by locally stiffening and therefore reinforcing the cross-section. From manufacturing feasibility perspective, the protrusions are regarded a highly cost-effective performance enhancement, as they can be easily integrated into a tool and produced by means of standard manufacturing techniques. For example of a radial shaft seal of an inner diameter of 28 mm, an outer diameter of 40 mm and a radial thickness of 6 mm, a total of 6 equally spaced protrusions can be provided along the circumference.

Preferably, the protrusions axially extend from the holding section towards the spring to form an axial stop for the spring and, thus, for the free second end of the sealing lip when the deformation zone of the sealing lip is deformed radially inwards. In the unmounted state or, when mounted, in the unpressurized state of the radial shaft seal, the spring can either abut the protrusions or be spaced apart from the protrusions.

Preferably, as viewed in the circumferential direction of the sealing ring, the distance between the protrusions is greater than the width of the protrusions. For example, the distance between the protrusions can be at least two times, preferably at least five times, greater than the width of the protrusions. This is positive for the sealing function, as too large circumferential portion of protrusions would have a negative effect on the ability of the sealing lip to follow an eccentric shaft.

Preferably, the protrusions are equidistantly spaced apart from each other in the circumferential direction of the sealing ring.

Preferably, the sealing ring has a plurality of elevations and/or indentations within the groove at and/or between the positions of the protrusions such that the spring is locally lifted at least partially out of the groove by the elevations or locally lowered within the groove by the indentations.

In one embodiment, at least one of the protrusions axially extends further towards the spring than the other protrusions. For example, some protrusions are always in contact with the spring and other protrusions only when pressurized.

Preferably, the deforming zone is weakened in the region at and/or between the protrusions. For example, the deforming zone (membrane) is thinner by 10 to 50%, preferably by 20 to 40%, in the weakened region than in the region which is not weakened. As a result, the deformation behavior of the deforming zone can advantageously be affected when pressurized and, for example, an early contact of the protrusions with the spring can be achieved.

In one embodiment, at least one of the protrusions axially extends further towards the spring than the other protrusions. Preferably, the at least one protrusion is at the radial height of the radial inner end of the reinforcement insert. Preferably, the radial height of the protrusion corresponds maximally to the double diameter of the groove, in particular, maximally to the diameter of the groove. Preferably, the axial length of the protrusion with respect to the reinforcement insert is maximally five times the diameter of the groove, in particular, maximally three times the diameter of the groove. A short deformation zone is advantageous for the sealing behavior of radial shaft seals.

A sealing arrangement comprises a first machine part and a second machine part surrounded by the first machine part, which machine parts are arranged at a space to seal a gap, and a radial shaft seal according to the invention. The holding section of the radial shaft seal is held in one of the two machine parts, and the sealing lip of the radial shaft seal mates with a running counter surface of the respective other machine part to form a dynamic sealing contact. The protrusion serve to locally stiffen the cross-section of the deformation zone.

Features which have been described in connection with one of the objects of the invention, in particular, given by the sealing ring according to the invention and the arrangement according to the invention, can also be advantageously realised for the other objects of the invention. Advantages which are realised in connection with one of the objects of the invention, in particular, given by the sealing ring according to the invention, and the arrangement according to the invention, can also be understood in relation to the other objects of the invention. In the following, examples of embodiments of the invention are described in more detail with reference to the drawings. The figures each show preferred embodiments in which individual features of the present invention may be shown in combination with one another. Features of an embodiment example can also be used separately from the other features of the same embodiment example and can accordingly be readily combined by a person skilled in the art to form further useful combinations and sub-combinations with features of other embodiment examples.

DETAILED DESCRIPTION OF EMBODIMENTS OF THE INVENTION

Figure 1:
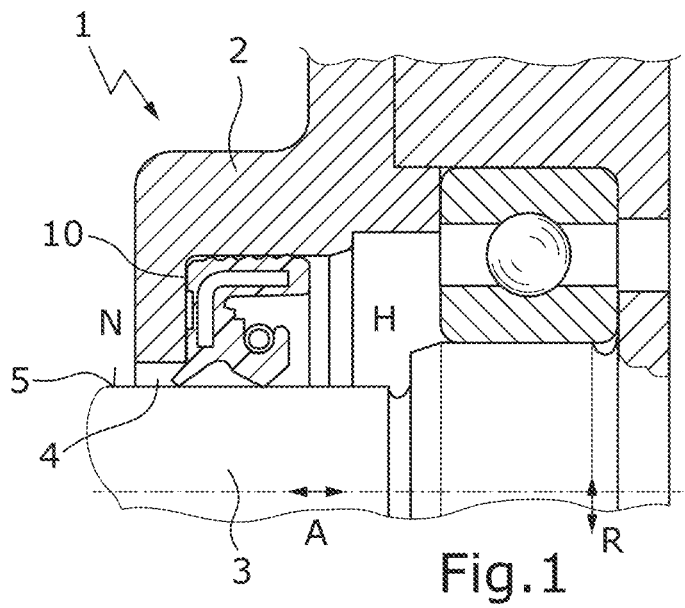
FIG. 1 shows an axial section view of a sealing arrangement with a radial shaft seal according to the invention.

FIG. 1 shows a sealing arrangement 1 for sealing two machine parts. The sealing arrangement 1 comprises a first machine part 2 and a second machine part (e.g., a shaft) 3 surrounded by the first machine part 2. The two machine parts 2, 3 are arranged spaced apart to form a gap 4. The sealing arrangement 1 further comprises a radial shaft seal 10 for sealing the gap 4. The radial shaft seal 10 is held in the first machine part 2 and mates with a counter surface 5 of the second machine part 3 for dynamic sealing contact. The radial shaft seal 10 typically separates an air side (low pressure side) N from an oil side (high pressure side) H. The axial direction of the radial shaft seal 10 and the sealing arrangement 1 is denoted by double arrow A and the radial direction of the radial shaft seal 10 and the sealing arrangement 1 is denoted by double arrow R.

Figure 2A:
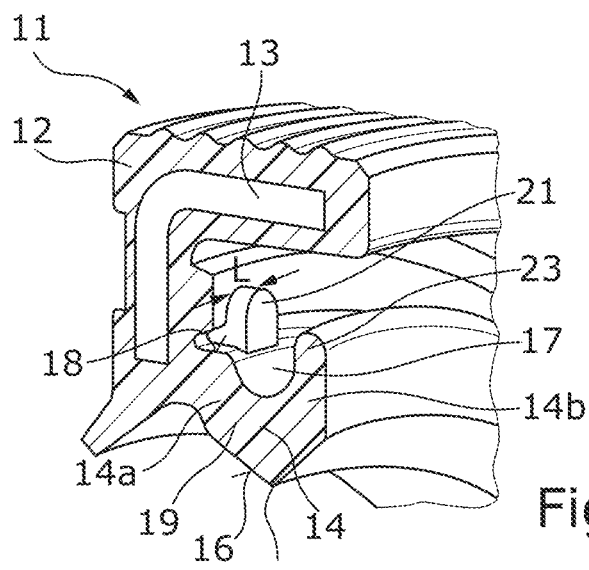
FIGS. 2a-2c show different axial section views of the radial shaft seal of FIG. 1 in an unmounted state.
Figure 2B:
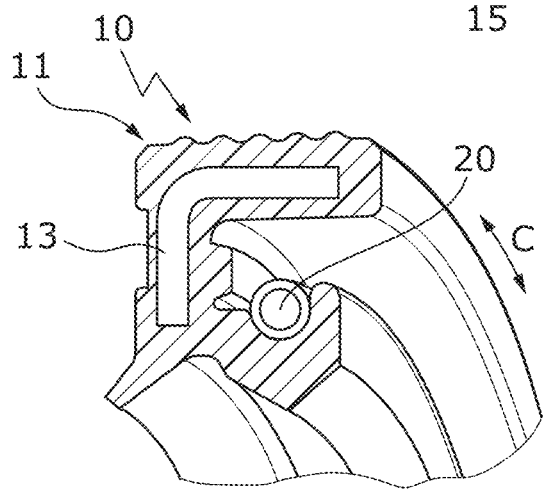
Figure 2C:
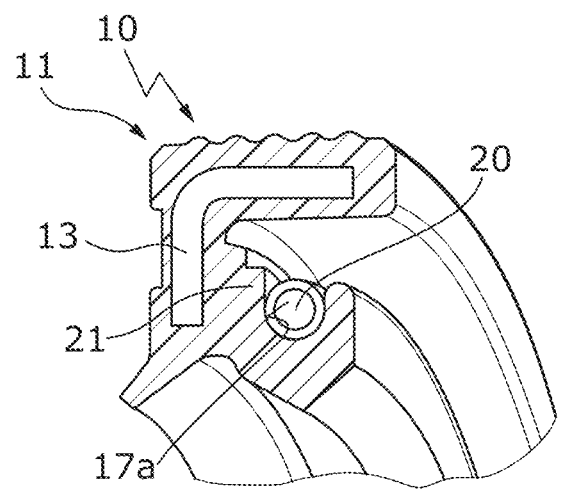

As shown in FIGS. 2a-2c, the radial shaft seal 10 comprises a sealing ring 11 made from polymer materiel, e.g., elastomer material, with a holding section 12 having a polymer-bonded, e.g., an elastomer-covered reinforcement (e.g., metal) insert 13, and with a sealing lip 14 extending away from the holding section 12 in an axial direction of the sealing ring 11. The sealing lip 14 has a first end 14a connected to the holding section 12 and a free second end 14b provided with a sealing edge 15 on a radial inside 16 of the sealing lip 14 and a groove 17 on a radial outside 18 of the sealing lip 14. A radially deformable deformation zone 19, also referred to as a flexible membrane, of the sealing lip 14 is provided between the first end 14a and the sealing edge 15. The radial shaft seal 10 comprises further a spring 20 received in the groove 17 for preloading or energizing the sealing lip 14. The circumferential direction of the radial shaft seal 10 is denoted by double arrow C.

The sealing ring 11 comprises a plurality of protrusions 21 spaced apart from each other in a circumferential direction C of the sealing ring 11, e.g., four or six protrusions 21 which are equidistantly spaced apart from each other in the circumferential direction C. FIG. 2b is an axial section view of the radial shaft seal 10 a protrusion 21, and FIG. 2c is an axial section view of the radial shaft seal 10 through a protrusion 21. Each of the protrusions 21 is integrally formed on both the radial outside 18 of the sealing lip 14 and the holding section 12. Preferably, as viewed in the circumferential direction C of the sealing ring 11, the length L of the protrusions 21 is smaller than the distance between the protrusions 21. The protrusions 21 form an axial stop for the spring 20 and, thus, for the free second end 14b of the sealing lip 14 when the deformation zone 19 is deformed radially inwards. The purpose of the local protrusions 21 is to minimize the deformation of the deformation zone 19 at high pressure, realized with movement restrictions of the axial outer groove wall 23 towards the holding section 12 via the following working chain: axial outer groove wall 23, spring 20, local protrusions 21 and holding section 12 with reinforcement insert 13. As shown, the protrusions 21 are at the radial height of the radial inner end of the reinforcement insert 13.

The protrusions 21 are integrally formed with the elastomer material of the holding section 12 and axially extend from the holding section 12 towards the spring 20 to form an axial stop for the spring 20 and, thus, for the second end 14b of the sealing lip 14 when the deformation zone 19 of the sealing lip 14 is deformed radially inwards. In FIG. 2, the protrusions 21 are flush with an axial inner, first groove flank 17a, facing the first end 14a of the sealing lip 14, of the groove 17. Alternatively, the protrusions 21 can end in an axial distance from the first groove flank 17a.

Figure 3A:
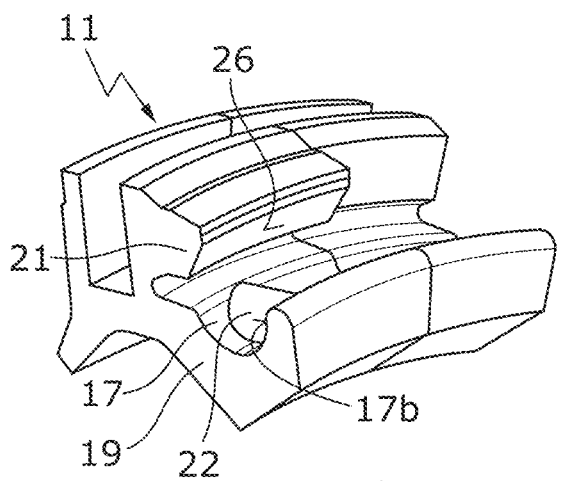
FIGS. 3a-3f show axial section views of modified radial shaft seals according to the invention in an unmounted state.

As shown in FIG. 3a, the sealing ring 11 can optionally have a plurality of elevations 22 within the groove 17 at or near the positions of the protrusions 21 such that the spring 20 is locally lifted at least partially out of the groove 17. The elevations 22 work like tension rods where the deformation zone 19 is local connected to an axial outer, second groove flank 17b of the groove 17.

Figure 3B:
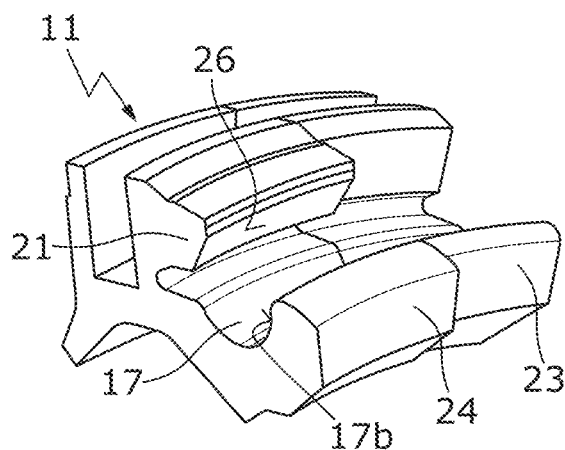

As shown in FIG. 3b, an axial outer groove wall 23 of the sealing lip 13 has a plurality of axial outer projections 24 at or near the positions of the protrusions 21 such that the wall thickness at or near the positions of the protrusions 21 is greater than at the positions between the protrusions 21. The axial outer projections 24 reduce the deformations inside the axial outer groove wall 23, so that the tensions loss between the deformation zone 19 collapsing under pressure and the axial outer groove flank 17b moving restrictively is reduced. Overall, it should be understood that the cross section between the sealing edge 15 and the groove 17 has to be dimensioned in a conveniently way to ensure that the transfer of the tensions between the deformation zone 19 and the axial outer groove flank 17b can take place under pressure. The preferred distance of the outer groove flank 17b to the axial outer end of the sealing ring 11 is at least ⅙ of the radial distance between the sealing edge 15 and the groove base and preferably a maximum of three times the radial distance. This ensures that the resulting forces can be transferred under pressure.

Figure 3C:
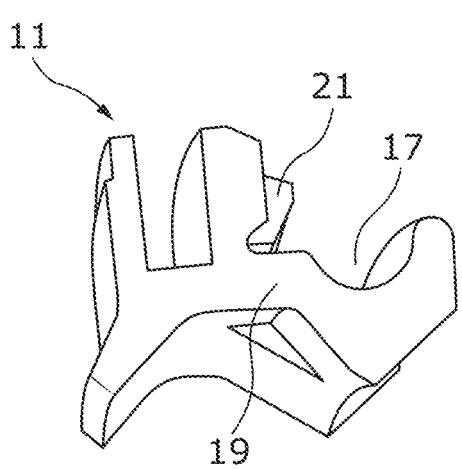

As shown in FIG. 3c, the deforming zone 19 can optionally be weakened in the region between the protrusions 21 and/or at or near the positions of the protrusions 21, e.g., by reducing the radial thickness of the deforming zone 19.

Figure 3D:
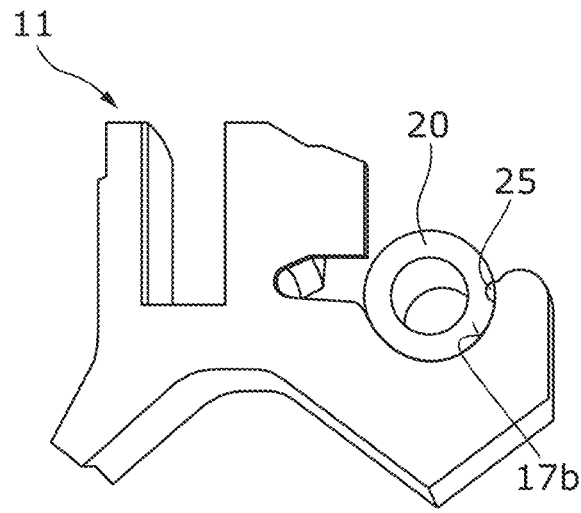

As shown in FIG. 3d, the axial outer groove flank 17b has a plurality of axial inner projections 25 at or near the positions of the protrusions 21 such that the spring 20 is locally deflected in an axial direction towards the protrusions 21.

Figure 3E:
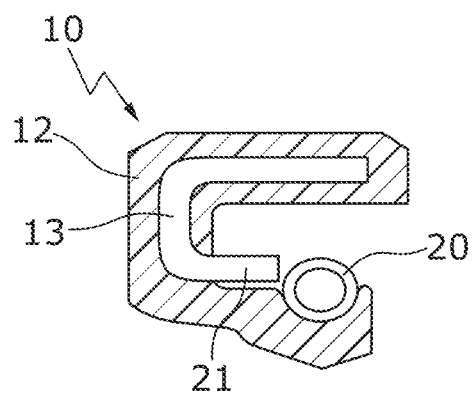

As shown in FIG. 3e, the protrusions 21 can alternatively be formed by the reinforcement insert 13.

Figure 3F:
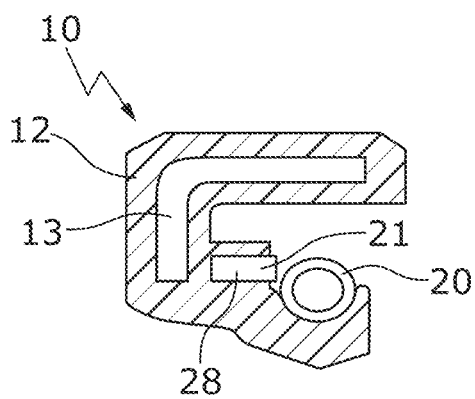

As shown in FIG. 3f, the protrusions 21 can also be formed by a separate insert 28 which is form-fitting to the holding section 12, e.g., made by additive manufacturing or injection molding, or other suitable process.

Figure 4A:
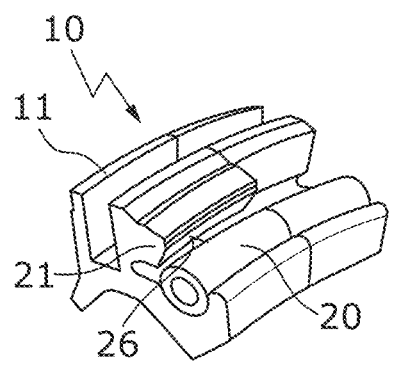
FIGS. 4a-4c show axial section views of modified radial shaft seals according to the invention in an unmounted state.
Figure 4B:
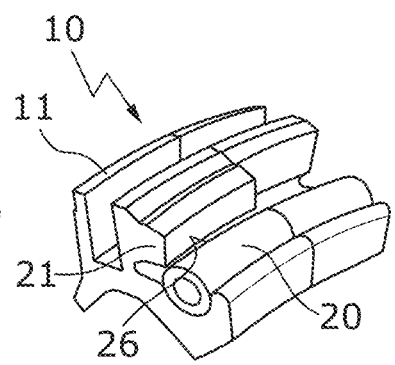
Figure 4C:
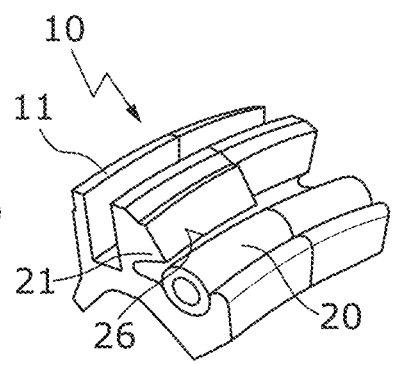

As shown in FIGS. 4a-4c, the protrusion 21 has a stop surface 26 which, in the unmounted state of the radial shaft seal 10, is either parallel to a radial plane (perpendicular to the axial direction of the sealing ring) of the sealing ring 10 (FIG. 4b or inclined in a direction towards the spring 20 (FIG. 4a) or away from the spring 20 (FIG. 4c). In the unmounted state the spring 20 is spaced apart from the protrusion 21. Alternatively, the spring 20 can already abut the protrusion 21 in the unmounted state.

Figure 5:
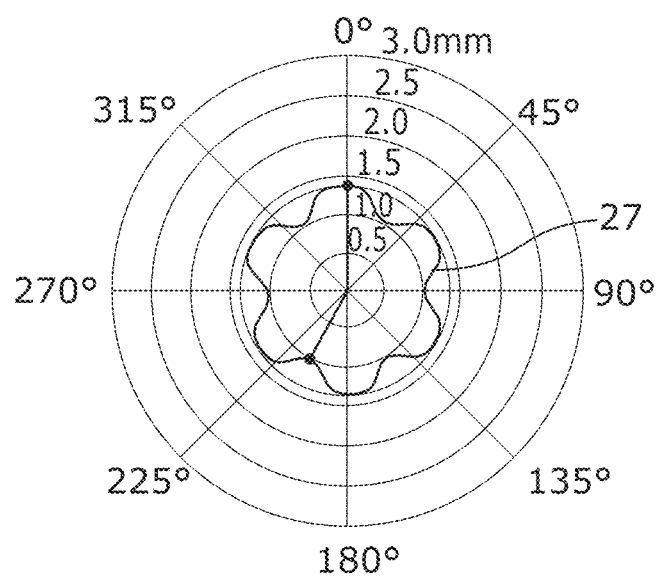
FIG. 5 shows an undulating contact band width of a sealing edge of the radial shaft seal of FIG. 2.

FIG. 5 shows the undulation of the contact width of the sealing edge 15 due to six protrusions 21. At the position of the protrusions 21, the contact width is reduced, forming a daisy pattern along the circumference of the radial shaft seal 10. The reduced contact width translates to a lower friction torque and less wear on the radial shaft seal 10. Furthermore, the undulation in the sealing contact can improve the lubrication underneath the sealing lip 14, prolonging the lifetime of the radial shaft seal 10.

Instead of a plurality of protrusions 21, alternatively, only one circumferential closed protrusion 21 can be formed on the holding section 12 to form a circumferential axial stop for the spring 20 and, thus, for the second end 14b of the sealing lip 14 when the deformation zone 19 of the sealing lip 14 is deformed radially inwards.

What is claimed is:

1. A radial shaft seal, comprising:
    a sealing ring made from polymer material, with a holding section having an polymer-bonded reinforcement insert, and with a sealing lip extending away from the holding section in an axial direction of the sealing ring, wherein the sealing lip has a first end connected to the holding section and a free second end provided with a sealing edge on a radial inside of the sealing lip and a groove on a radial outside of the sealing lip, and wherein a radially deformable deformation zone of the sealing lip is provided between the first end and the sealing edge;
    a spring received in the groove configured for preloading the sealing lip;
    wherein the sealing ring comprises at least one protrusion formed on the holding section and axially extending from the holding section towards the spring forming an axial stop for the spring and, thus, for the second end of the sealing lip when the deformation zone of the sealing lip is deformed radially inwards;
    wherein the sealing ring comprises a plurality of protrusions spaced apart from each other in a circumferential direction of the sealing ring;
    wherein the sealing ring has a plurality of elevations and/or indentations within the groove at and/or between the positions of the protrusions where the spring is locally lifted at least partially out of the groove by the elevations or locally lowered within the groove by the indentations.

2. The radial shaft seal of claim 1, wherein the at least one protrusion is integrally formed with the polymer material of the holding section or with the reinforcement insert of the holding section.

3. The radial shaft seal of claim 1, wherein the at least one protrusion is formed by a separate insert which is form-fitting and/or force-fitting and/or material-fitting to the holding section.

4. The radial shaft seal of claim 1, wherein the at least one protrusion has a stop surface which is either parallel to a radial plane of the sealing ring or inclined in a direction towards the spring or away from the spring.

5. The radial shaft seal of claim 1, wherein the sealing ring comprises one enclosed circumferential protrusion formed on the holding section to form a circumferential axial stop for the spring and, thus, for the free second end of the sealing lip when the deformation zone of the sealing lip is deformed radially inwards.

6. The radial shaft seal of claim 1, wherein, as viewed in the circumferential direction of the sealing ring, the distance between the protrusions is greater than the length of the protrusions.

7. The radial shaft seal of claim 1, wherein the protrusions are equidistantly spaced apart from each other in the circumferential direction of the sealing ring.

8. The radial shaft seal of claim 1, wherein the deforming zone is weakened in the region at and/or between the protrusions.

9. The radial shaft seal of claim 1, wherein an axial outer groove flank of the groove is formed by an axial outer groove wall of the sealing lip and wherein the outer groove wall has a plurality of axial outer projections at and/or between the positions of the protrusions where the wall thickness of the outer groove wall is greater at the positions of the axial outer projections.

10. The radial shaft seal of claim 1, wherein an axial outer groove flank of the groove has a plurality of axial inner projections at and/or between the positions of the protrusions where the spring is locally deflected in an axial direction towards the protrusions.

11. The radial shaft seal of claim 1, wherein at least one of the protrusions axially extends further towards the spring than the other protrusions.

12. A sealing arrangement comprising a first machine part and a second machine part surrounded by the first machine part, which machine parts are arranged spaced apart to form a gap, and comprising the radial shaft seal of claim 1, the holding section of which is held in one of the two machine parts, wherein the sealing lip of the radial shaft seal mates with a running counter surface of the respective other machine part to form a dynamic sealing contact.

13. A radial shaft seal, comprising:
- a sealing ring made from polymer material, with a holding section having a polymer-bonded reinforcement insert, and with a sealing lip extending away from the holding section in an axial direction of the sealing ring, wherein the sealing lip has a first end connected to the holding section and a free second end provided with a sealing edge on a radial inside of the sealing lip and a groove on a radial outside of the sealing lip, and wherein a radially deformable deformation zone of the sealing lip is provided between the first end and the sealing edge;
- a spring received in the groove configured for preloading the sealing lip;
- wherein the sealing ring comprises a plurality of protrusions spaced apart from each other in a circumferential direction of the sealing ring, and wherein each of the protrusions is integrally formed on both the radial outside of the sealing lip and the holding section locally stiffening the cross-section of the deformation zone;
- wherein the sealing ring has a plurality of elevations and/or indentations within the groove at and/or between the positions of the protrusions where the spring is locally lifted at least partially out of the groove by the elevations or locally lowered within the groove by the indentations.

14. The radial shaft seal of claim 13, wherein the protrusions axially extend from the holding section towards the spring forming an axial stop for the spring and, thus, for the second end of the sealing lip when the deformation zone of the sealing lip is deformed radially inwards.

15. The radial shaft seal of claim 13, wherein, as viewed in the circumferential direction of the sealing ring, the distance between the protrusions is greater than the length of the protrusions.

16. The radial shaft seal of claim 13, wherein the protrusions are equidistantly spaced apart from each other in the circumferential direction of the sealing ring.

17. The radial shaft seal of claim 13, wherein the deforming zone is weakened in the region at and/or between the protrusions.

18. A sealing arrangement comprising a first machine part and a second machine part surrounded by the first machine part, which machine parts are arranged spaced apart to form a gap, and comprising the radial shaft seal of claim 15, the holding section of which is held in one of the two machine parts, wherein the sealing lip of the radial shaft seal mates with a running counter surface of the respective other machine part to form a dynamic sealing contact.

* * * * *